C. H. ALDRICH & J. K. BRYAN.
PROCESS AND APPARATUS FOR PURIFYING ACID ELECTROLYTE USED IN REFINING COPPER.
APPLICATION FILED JUNE 25, 1910.
991,685. Patented May 9, 1911.
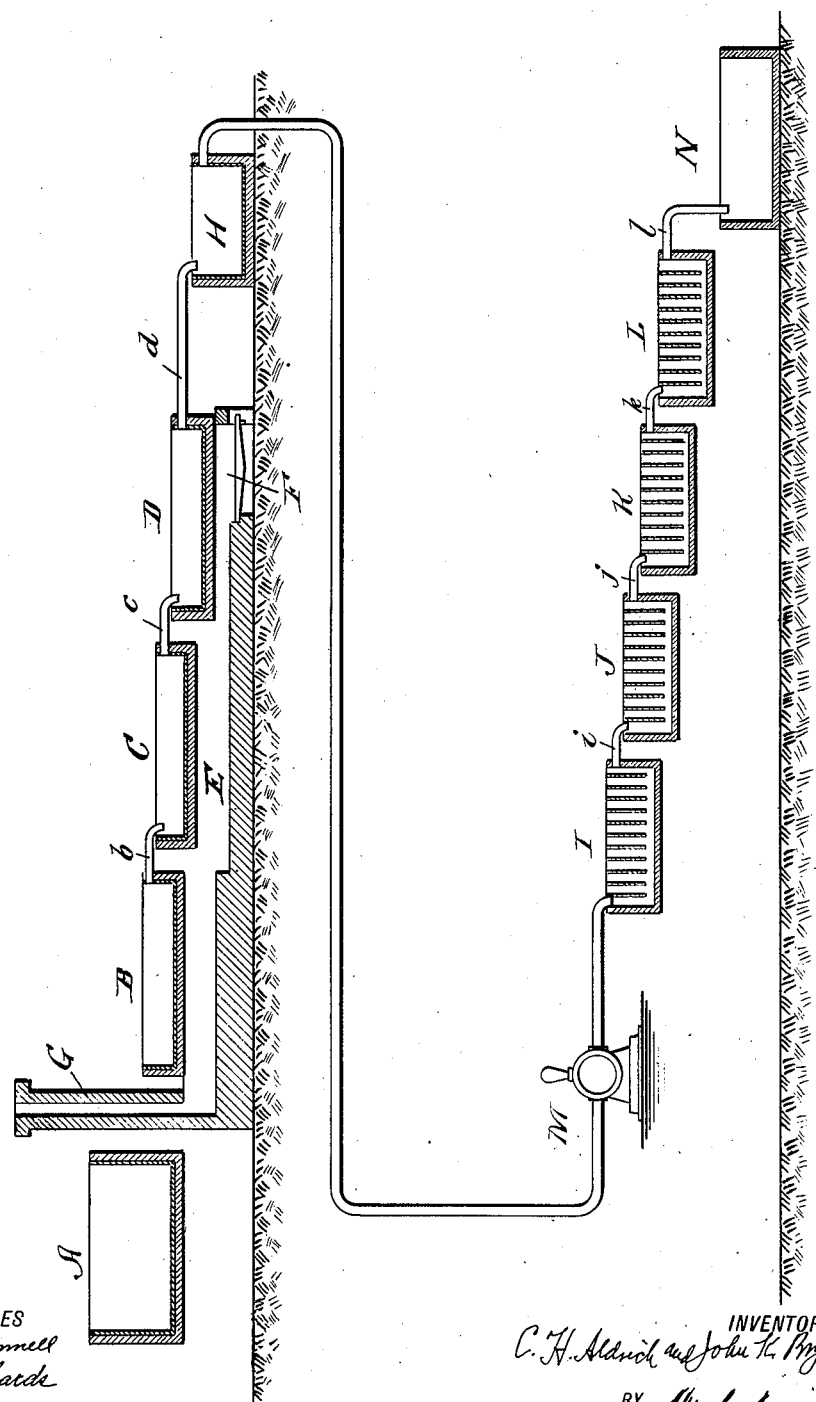
WITNESSES
INVENTORS
ATTORNEY

UNITED STATES PATENT OFFICE.

CHARLES H. ALDRICH AND JOHN K. BRYAN, OF PERTH AMBOY, NEW JERSEY.

PROCESS AND APPARATUS FOR PURIFYING ACID ELECTROLYTE USED IN REFINING COPPER.

991,685.  Specification of Letters Patent.  Patented May 9, 1911.

Application filed June 25, 1910. Serial No. 568,783.

*To all whom it may concern:*

Be it known that we, CHARLES H. ALDRICH and JOHN K. BRYAN, citizens of the United States, and residents of Perth Amboy, county of Middlesex, State of New Jersey, have invented certain new and useful Improvements in Processes and Apparatus for Purifying Acid Electrolyte Used in Refining Copper, of which the following is a specification.

The present invention relates to the purification of the acid electrolyte used in the electrolytic refining of copper and has for its main purposes, first, the provision of a process whereby the impurities will be fractionally separated out from the electrolyte, second, the provision of a process whereby arsenic and antimony may be electrolytically separated from mother liquor from which the iron, copper, zinc etc. have been substantially removed, and third, the provision of an apparatus for carrying such process into effect in a most practicable manner.

In the electrolytic refining of copper the solution becomes impure and it is necessary to remove large quantities of the same periodically in order to maintain the requisite purity of the electrolyte.

The common practice is to crystallize out the bulk of the copper as blue vitriol, sometimes with the previous step of neutralizing the free acid of the electrolyte by passing over "shot" copper, and sometimes without such step of neutralization, and then precipitate the remaining copper on scrap iron. In either case, the residue is discarded; though it has been proposed to subject this residue to further purification steps with a view of separating by precipitation the acid salts, as iron, arsenic, and antimony therefrom. In these proposals, the copper, iron and nickel are not fractionally separated out of the mother liquor, nor are the arsenic and antimony separated from the residue.

In the accompanying drawings there is illustrated an apparatus designed to carry into effect the novel process of the present invention, said apparatus being shown partly in section and partly diagrammatically.

In the practice of the present process, the impure electrolyte, which is of about 18° to 25°, Baumé, is concentrated to about 45° Baumé, in a lead lined tank A, by heating by means of lead coils, or otherwise as desired. This is delivered in any suitable manner to an iron pan B, preferably lead lined, and is therein concentrated to about 50° Baumé. At this density the settling of the anhydrous salts to the bottom of the pan commences. The salts are allowed to crystallize out until the bulk of the copper is removed. Thus far the process is the one usually pursued. In accordance with the present process, however, instead of precipitating the copper, nickel and iron salts in one pan, the mother liquor, after the bulk of the copper has been separated out, is subjected successively to steps of precipitation adapted fractionally to separate the nickel, copper and iron salts therefrom, and thereby secure a better separation thereof. To this end, the liquor is caused to pass successively, either in a continuous or intermittent flow, as desired, from the pan B through a plurality of heated iron pans, as C and D, whose number depends on the percentage of nickel, copper and iron salts in the mother liquor. The pans are arranged in cascade and they are artificially heated by products of combustion which flow beneath the series of pans, B, C and D through a heating passage E extending from a furnace F contiguous to the last pan (as D) of the series to a stack G adjacent to the first pan (as B) of the series. The communication between these pans is preferably provided by means of overflow pipes $b$ and $c$ respectively. The pans C and D may be lead lined. By this described method the mother liquor is concentrated to about 60° or 70°, Baumé, the salts being fractionally precipitated in the cascade of pans, the precipitate in the first pan or pans being relatively rich in copper, that in the intermediate pan or pans containing copper and nickel in approximately equal quantities, and that in the last pan or pans being relatively rich in nickel.

The anhydrous salts are handled in any suitable manner for purification.

The resulting solution is allowed to settle in a lead lined tank, H, having communication with the tank D preferably by means of an overflow pipe $d$ leading from the latter and from the tank H is pumped, by means of a pump M, into an electrolytic refining tank or into electrolytic refining tanks, I, J, K, L preferably arranged in cascade and having communication with each other by means of overflow pipes $i$, $j$, $k$. This solution contains only traces of copper, iron, nickel and zinc but contains a material amount of arsenic and antimony in solution. In the electrolytic tanks the temperature of the solution is preferably maintained at from 170° to 180° F. and the solution either with or without dilution is subjected to electrolysis, insoluble anodes being used and sheets of lead, copper, iron or other suitable metal that does not dissolve in the electrolyte employed forming the cathodes. The electrolysis is continued until the bulk of the arsenic together with traces of the copper and antimony have been precipitated as a deposit on the cathodes. Only enough arsenic is left in solution to prevent the formation of arsine on the cathode. If suitable ventilating systems are employed practically all the arsenic can be removed from the solution. Our experience has shown that the presence of a trace of copper, as copper sulfate, in the arsenic electrolyte is advantageous, as it facilitates the deposition of the arsenic. The arsenic deposit contains copper, antimony etc. from which it can be easily separated and recovered by burning in a small furnace provided with suitable condensing flues. The residue is composed principally of copper oxid which is worked up in a blast furnace in the usual way. The liquor which has been thus purified flows from the last electrolytic tank, L, of the series through an overflow pipe $l$ into a tank N, where it is permitted to settle and from which it may be returned to the copper refining bath.

It is to be understood that numerous changes can be made in the details of the process and apparatus hereinbefore described without departing from the spirit of the invention or the scope of the appended claims.

Having now described our invention what we believe to be new and desire to secure by Letters Patent, is:

1. The herein described process of purifying the electrolyte produced in the electrolytic refining of copper which consists in removing the greater portion of the contained copper, concentrating the residue until all but traces of the copper, nickel, iron and zinc contained are precipitated and separating the arsenic and antimony with traces of other impurities from the resulting solution by electrolysis.

2. The herein described process of purifying the electrolyte produced in the electrolytic refining of copper which consists in removing the greater portion of the contained copper, concentrating the residue by successive stages until all but traces of the copper, nickel, iron and zinc contained therein are precipitated, and freeing the arsenic and antimony with traces of other impurities by electrolysis.

3. The herein described process of purifying the electrolyte produced in the electrolytic refining of copper which consists in removing the greater portion of the contained copper, concentrating the residue by successive stages until all but traces of the copper, nickel, iron and zinc contained therein are precipitated and freeing the arsenic and antimony with traces of other impurities by electrolysis at a temperature of approximately 170° to 180° F.

4. The herein described process of purifying the electrolyte produced in the electrolytic refining of copper which consists in removing the greater portion of the contained copper by concentration and crystallization, concentrating the residue by successive stages to about 70° Baumé, separating the electrolyte from the precipitate and finally separating the remaining metallic impurities from the electrolyte by electrolysis.

5. The herein described process of purifying the electrolyte produced in the electrolytic refining of copper which consists in removing the greater portion of the contained copper by concentration, removing the mother liquor from the precipitate, concentrating the mother liquor by successive stages, separating the mother liquor from the precipitate formed from the last concentration, and finally removing the remaining metallic impurities by electrolysis.

6. The herein described process of purifying the electrolyte produced in the electrolytic refining of copper which consists in removing the greater portion of the contained copper by concentration to about 50° Baumé and removal of the mother liquor from the precipitate, concentrating the mother liquor by successive stages to about 70°–72° Baumé, separating the mother liquor from the precipitate formed and finally removing the remaining metallic impurities by electrolysis at approximately 170°–180° F.

7. The herein described process of purifying the electrolyte produced in the electrolytic refining of copper which consists in removing the greater portion of the contained copper by concentration and crystallization, concentrating the residue until all but traces of the copper, nickel, iron and zinc contained therein are precipitated, freeing the electrolyte from the precipitate, and finally separating the arsenic and antimony and traces of other metallic impurities contained in the residue of the electrolyte by electrolysis.

8. The herein described process of purifying the electrolyte produced in the electrolytic refining of copper which consists in removing the greater portion of the contained copper by concentration and crystallization, concentrating the residue by passing it through a plurality of heated containers arranged in cascade, until all but traces of the copper, nickel, iron and zinc contained therein are precipitated, freeing the electrolyte from the precipitate and finally separating the arsenic, antimony and traces of the other metal impurities contained in the residue of the electrolyte by electrolysis.

9. The herein described process of purifying the electrolyte produced in the electrolytic refining of copper which consists in removing the greater portion of the contained copper by concentration, separating the electrolyte from the precipitate formed, concentrating the electrolyte by passing it through a plurality of heated containers arranged in cascade wherein the solution is concentrated, and all but traces of the metallic impurities, except arsenic and antimony, contained therein are precipitated, separating the electrolyte from the precipitate, and finally separating the arsenic, antimony and traces of the other metal impurities contained therein by electrolysis.

10. The herein described process of purifying the electrolyte produced in the electrolytic refining of copper which consists in removing the greater portion of the contained copper by concentration, separating the electrolyte from the precipitate formed, concentrating the electrolyte by passing it through a plurality of heated containers arranged in cascade wherein the solution is concentrated and all but traces of the copper, nickel, iron and zinc contained therein are precipitated, separating the electrolyte from the precipitate, and finally separating the arsenic, antimony and traces of other metal impurities contained therein by electrolysis.

11. The herein described process of purifying the electrolyte produced in the electrolytic refining of copper which consists in removing the greater portion of the contained copper by concentration to about 50° Baumé separating the electrolyte from the precipitate formed, concentrating the electrolyte by passing it through a plurality of heated containers arranged in cascade wherein the solution is concentrated to approximately 70–72° Baumé and all but traces of the copper, nickel, iron and zinc contained therein are precipitated, separating the electrolyte from the precipitate and finally separating the arsenic, antimony and traces of other metal impurities contained therein by electrolysis at approximately from 170–180° F.

12. The herein described process of purifying the electrolyte produced in the electrolytic refining of copper, the step of fractionally separating out metallic impurities from the electrolyte, which consists in passing the electrolyte through a series of heated containers arranged in cascade.

13. In the herein described process of purifying the electrolyte produced in the electrolytic refining of copper, the step of separating the arsenic and antimony from the electrolyte which has been substantially freed from other metallic impurities, consisting in subjecting the solution to an electrolytic action.

14. In the herein described process of purifying the electrolyte produced in the electrolytic refining of copper, the step of separating the arsenic and antimony from the electrolyte which has been substantially freed from other metallic impurities, consisting in subjecting the solution to an electrolytic action successively in a series of containers arranged in cascade.

15. An apparatus for purifying the electrolyte produced in the electrolytic refining of copper, comprising means for removing the greater portion of the contained copper, means adapted for concentration of the residue until all but traces of the copper, nickel, iron and zinc are precipitated and means adapted electrolytically to separate therefrom the arsenic and antimony with traces of other metal impurities contained therein.

16. An apparatus for purifying the electrolyte produced in the electrolytic refining of copper, comprising means for removing the greater portion of the contained copper, and a series of heated containers arranged in cascade wherein the electrolyte is gradually concentrated by evaporation whereby all but traces of copper, nickel, iron and zinc contained therein is fractionally separated from the residue.

17. An apparatus for purifying the electrolyte produced in the electrolytic refining of copper, comprising means for removing the greater portion of the contained copper, a series of heated containers arranged in cascade wherein the electrolyte is gradually concentrated by evaporation whereby all but traces of copper, nickel, iron and zinc contained therein is fractionally separated from the residue, and means adapted to separate arsenic and antimony from the liquor by electrolysis.

18. An apparatus for purifying the electrolyte produced in the electrolytic refining of copper, comprising means for removing the greater portion of the contained copper, a series of heated containers arranged in cascade for fractionally separating from the residue all but traces of copper, iron and zinc contained therein, and means for separating arsenic and antimony from the liquor by electrolysis, the latter means comprising a series of electrolytic containers, having connection with each other and with the first mentioned series of containers.

19. The herein described apparatus for purifying the electrolyte produced in the electrolytic refining of copper, comprising a heated concentrating tank, a series of connected heated containers arranged in cascade and having connection with said tank, said containers fractionally removing copper, nickel, etc., from the electrolyte, a settling tank having means for communication with said series of containers, a pump connected with the settling tank, and a series of connected containers having connection with the pump and provided with means for removing arsenic and antimony from the solution by electrolysis.

In witness whereof we have hereunto set our hands at Perth Amboy, county of Middlesex, and State of New Jersey, this 17th day of June, 1910.

CHARLES H. ALDRICH.
JOHN K. BRYAN.

In presence of—
A. O. RULEMANN,
CHAS. J. WARNER.